US011246042B2

(12) United States Patent
Tsui et al.

(10) Patent No.: US 11,246,042 B2
(45) Date of Patent: Feb. 8, 2022

(54) UNIFIED SELF-OPTIMIZING NETWORK TO INCREASE CELL EDGE PERFORMANCE

(71) Applicant: AT&T INTELLECTUAL PROPERTY I, L.P., Atlanta, GA (US)

(72) Inventors: Ernest Tsui, Pleasanton, CA (US); Guanying Ru, San Ramon, CA (US); Rennie Archibald, Seattle, WA (US); Weihua Ye, Chicago, IL (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 85 days.

(21) Appl. No.: 16/744,914

(22) Filed: Jan. 16, 2020

(65) Prior Publication Data

US 2021/0227403 A1 Jul. 22, 2021

(51) Int. Cl.
*H04W 24/02* (2009.01)
*H04B 17/373* (2015.01)
*H04W 16/28* (2009.01)
*H04W 24/08* (2009.01)

(52) U.S. Cl.
CPC .......... *H04W 24/02* (2013.01); *H04B 17/373* (2015.01); *H04W 16/28* (2013.01); *H04W 24/08* (2013.01)

(58) Field of Classification Search
None
See application file for complete search history.

(56) References Cited

U.S. PATENT DOCUMENTS

| 6,937,863 | B1* | 8/2005 | Gordon | H04W 16/06 455/446 |
| 10,009,784 | B1* | 6/2018 | Evircan | H04L 41/5009 |
| 10,602,478 | B1* | 3/2020 | Marupaduga | H04B 7/0452 |
| 2005/0243762 | A1* | 11/2005 | Terry | H04W 72/0413 370/328 |
| 2007/0086406 | A1* | 4/2007 | Papasakellariou | H04W 16/04 370/343 |
| 2011/0136478 | A1* | 6/2011 | Trigui | H04W 24/02 455/418 |
| 2012/0155408 | A1* | 6/2012 | Pedersen | H04L 1/0026 370/329 |
| 2012/0252440 | A1* | 10/2012 | Watanabe | H04W 24/02 455/423 |
| 2013/0244668 | A1* | 9/2013 | Eckhardt | H04B 7/0617 455/446 |

(Continued)

*Primary Examiner* — Faruk Hamza
*Assistant Examiner* — Cassandra L Decker
(74) *Attorney, Agent, or Firm* — Amin, Turocy & Watson, LLP

(57) ABSTRACT

The described technology is generally directed towards jointly optimizing coverage, capacity, and layer balance in a wireless communications network while maintaining cell edge use device performance constraints. Aspects comprise monitoring edge user devices for performance information, and modifying the network based on the performance information, including jointly optimizing by changing antenna parameter data, layer balancing, handover biasing per cell neighbor pair, modifying scheduling priorities, and optimizing sector face harmonic throughput. Balancing uplink and downlink coverages are considered in the joint optimization. Further, interference is detected, predicted (as needed) and mitigated.

20 Claims, 12 Drawing Sheets

(56) References Cited

U.S. PATENT DOCUMENTS

| | | | |
|---|---|---|---|
| 2013/0260007 A1* | 10/2013 | Aldred | A23D 7/0053 426/602 |
| 2013/0331079 A1* | 12/2013 | Racz | H04W 84/18 455/418 |
| 2014/0293955 A1* | 10/2014 | Keerthi | H04L 5/006 370/330 |
| 2016/0337916 A1* | 11/2016 | Deenoo | H04W 36/0088 |
| 2016/0337919 A1* | 11/2016 | Bindrim | H04L 67/289 |
| 2017/0188379 A1* | 6/2017 | Shtrom | H04B 7/0691 |
| 2020/0382188 A1* | 12/2020 | Stephenne | H04L 5/14 |

* cited by examiner

UNIFIED SELF-OPTIMIZING NETWORK TO INCREASE CELL EDGE PERFORMANCE

TECHNICAL FIELD

The subject application is related to wireless communication systems, and more particularly to self-optimizing a wireless communication network to facilitate improved coverage, capacity and layer balance.

BACKGROUND

In wireless communication systems, there are various techniques to optimize the network with respect to coverage, capacity or interference. Although the optimization criteria are generally known, the gradient of the criteria is used, which tend to have local minimums, collide with other algorithms, and tend to perform poorly in general.

Further, the coverage, capacity and interference optimizations are performed separately and independently. Indeed, the different optimization algorithms that are used tend to counteract each other. For example, optimization of coverage generally causes interference to increase. As another example, contemporary algorithms for coverage optimization and capacity optimization can oppose each other (e.g., antenna uptilt increases coverage while antenna downtilt increases capacity).

Moreover, such algorithms consider items such as optimizing coverage to be determined by the downlink coverage, while neglecting the uplink portion. However, uplink needs to be considered, as uplink is becoming more and more limiting in that handheld devices attempt to save battery power despite exponential growth in their complexity, while being limited in volume/space due to the handheld nature of such devices.

BRIEF DESCRIPTION OF THE DRAWINGS

The technology described herein is illustrated by way of example and not limited in the accompanying figures in which like reference numerals indicate similar elements and in which.

DETAILED DESCRIPTION

Figure 1:
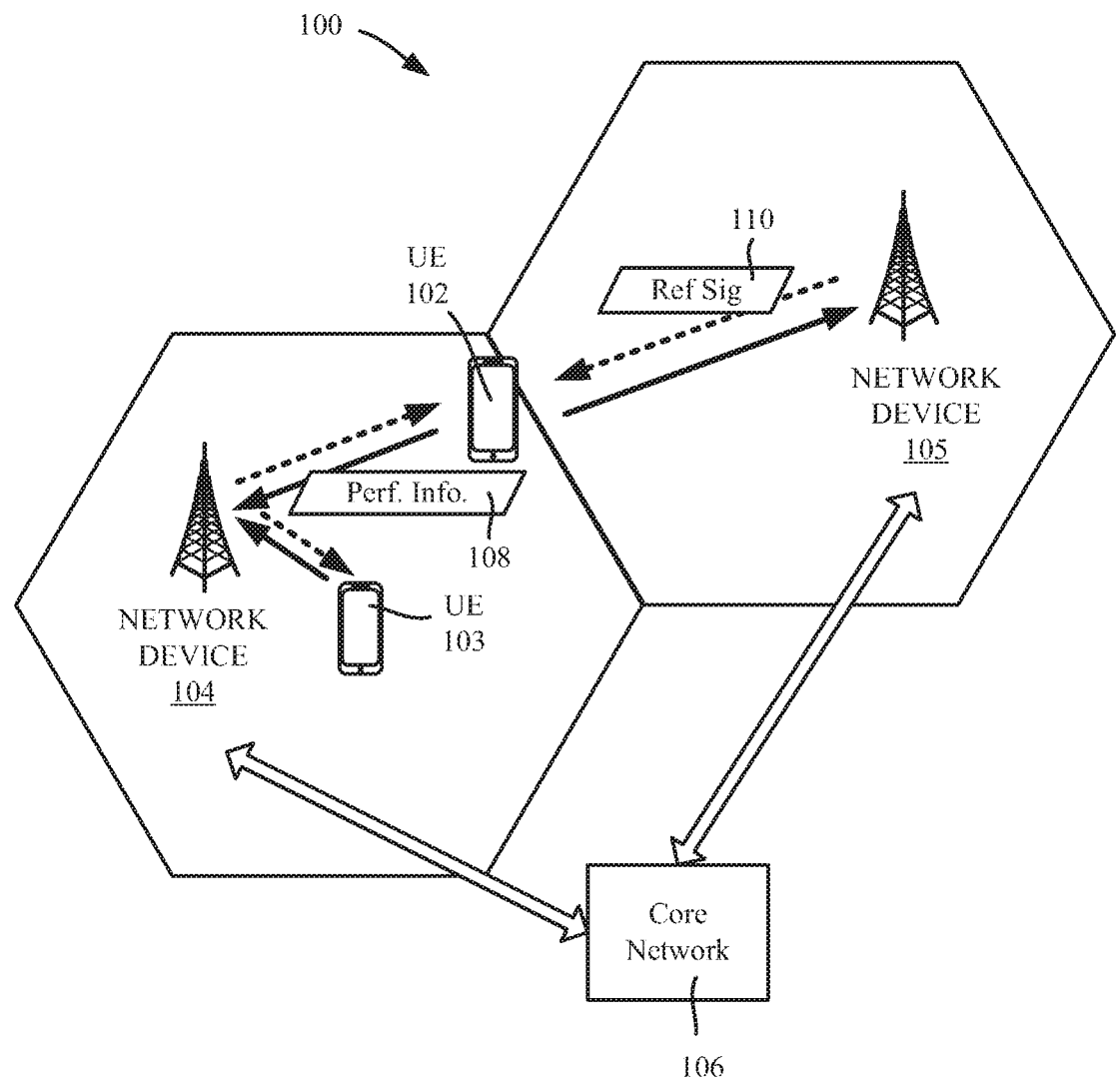
FIG. 1 illustrates an example wireless communication system in which a user device at the cell edge provides performance-related information to a network device for use in jointly optimizing a communications network, in accordance with various aspects and implementations of the subject disclosure.

Briefly, one or more aspects of the technology described herein are generally directed towards jointly optimizing coverage, capacity, and layer balance (including reducing interference; interference also negatively impacts capacity and coverage) to maintain cell edge performance criteria. Instead of conflicting algorithms, the joint optimization is based on synergistic inputs, including, but not limited to changing antenna parameter data (e.g., azimuth and/or elevation), handover biasing per cell neighbor pair, modifying scheduling priorities, optimizing sector face harmonic throughput, and so on. Both uplink and downlink coverages are considered in the optimization. Still further, interference is detected, predicted (as needed) and mitigated.

As will be understood, coverage, capacity, and layer balance are interrelated, and thus benefit from joint optimization as described herein. For example, user satisfaction is generally the poorest at the cell edge, and thus coverage needs to apply to a given area up to the cell edge, and layer balance for connected users can be changed at the cell edge. For example, interference from a neighbor cell site tends to be larger at the cell edge. At the same time, capacity of the cell is largely limited by the cell edge users because of control channel element (CCE) utilization, a more frequent need for repeat transmissions, the need for more time and frequency, e.g., via a lower modulation and coding scheme (MCS) and more physical resource blocks (PRBs).

In one aspect, the technology uses "priority" criteria that direct traffic to appropriate layers and user devices (user equipments, or UEs) within the layers. Scheduling priority can be modified, e.g., to give cell edge user devices higher priority and thus eliminate a number of cell-edge related issues. In turn coverage is not randomly changed, but rather tailored to facilitate the traffic steering.

In one aspect, handover threshold criteria can be biased to handover a user device to a neighbor cell to provide a better user experience, e.g., when handover would otherwise not occur. As will be understood, this can be accomplished by using an estimated channel quality indicator that is determined from reference signal received quality data and geographic location data for the user device.

In one example, a single criterion can be used, such as cell edge performance, rather than conflicting criteria so that significant cellular performance indicator improvements are obtained via joint optimization of coverage, capacity, and interference, while maintaining a constraint of a minimum cell edge user performance. The relationship between coverage, capacity, and interference can be defined, with modifications made to network (e.g., antenna) parameters to facilitate the optimization of the single criteria. Notwithstanding, more than one criterion can be used for optimization.

It should be noted that terms used herein, such as "optimize," "optimization" and the like only represent objectives to move towards a more optimal state, rather than obtaining ideal results; for example, "optimizing" a network as used herein means moving towards a more optimal state (e.g., with respect to capacity, coverage and layer balance), rather than necessarily achieving an optimal result. Similarly, terms such as "equalize" or "equalization" do not necessarily mean perfectly equal, but rather indicate more equalized than before any action in an attempt to equalize is taken. Other terms such as "balance" or "balancing" refer to a more balanced state, rather than necessarily achieving a perfect balance. Similarly, terms such as maximize and minimize and the like can represent intent rather than any literal definition.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details (and without applying to any particular networked environment or standard).

As used in this disclosure, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component.

One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

Moreover, terms such as "user device," "user equipment," "mobile device equipment," "mobile station," "mobile," "subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "gNode B (gNB)," "evolved Node B (eNode B)," "home Node B (HNB)" and the like, are utilized interchangeably in the application, and refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "customer entity," "consumer," "customer entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, comprising, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Z-Wave, Zigbee and other 802.XX wireless technologies and/or legacy telecommunication technologies.

FIG. 1 illustrates an example wireless communication system 100 in accordance with various aspects and embodiments of the subject technology. In various embodiments, the system 100 is or comprises a wireless communication network serviced by one or more wireless communication network providers. In example embodiments, a user device (UE, for user equipment) 102 near the cell edge and a UE 103 (a non-cell edge user device) can be communicatively coupled to the wireless communication network via a network device 104 (e.g., network node) and/or a network device 105. The network device(s) can communicate with the user devices 102 and 103, thus providing connectivity between the user devices 102 and 103 and the wider cellular network. As is understood, FIG. 1 is for purposes of illustration, and there can be many other user devices communicating with the network device(s) at any given time.

In example implementations, the UE 102 is able to send and/or receive communication data via a wireless link to the network device 104. The dashed arrow line from the networks device 104 to the user device 102 represents downlink (DL) communications and the solid arrow line from the user device 102 to the network device represents uplink (UL) communications.

The network devices 104 and 105 are connected to a core network 106, and can communicate with one another, via ideal backhaul for example. Note that this is only one example implementation.

In the example of FIG. 1, the wireless communication system 100 is depicted with a user device 102 that provides performance information 108 to the network device 104. The performance information can comprise generally directly reported information such as measurement reports, reference signal received quality (RSRQ) and/or other parameters, e.g., reference signal received power (RSRP), uplink signal-to-interference-plus-noise ratio (UL SINR), and so forth. The performance information need not be a report, but rather can be derived from other information and can be generally considered as indirect performance information, such as handover success or failure, downlink acknowledgements versus downlink negative acknowledgements (e.g., to compute downlink ACK/NACK ratio), uplink acknowledgements versus uplink negative acknowledgements (e.g., to compute uplink ACK/NACK ratio) and so on. Performance information can be determined by the network from multiple users, such as inter-frequency handover success rates, per layer information (channel quality indicator distribution per layer), layer path loss distributions, user throughput, sector face harmonic mean throughput and so forth.

As described herein, the performance information, particularly for cell edge user devices, can be used to jointly optimize coverage, capacity and layer balance. The joint optimization can be performed via a number of variable network parameter modifications, including, but not limited to, antenna parameter-related adjustments such as azimuth adjustment, (available for adaptive antennas), electrical elevation changes (for gradual adjustments, taking on the order of 30 seconds to a minute to complete), digital tilt (providing a near instantaneous elevation change) and beam shape (providing a near-instantaneous beam shape change, e.g., narrower or wider within the allowable aperture of the antenna). Other variable network parameter modifications can include handover biases, scheduler selection (e.g., to give higher priority to cell edge users), PO (the power controlled required uplink received power from users at the base station/spectral density) selection, and downlink power changes (gradual, e.g., in 1 dB steps). Still other modifications can be performed, such as resectorization to change the number of sectors (faces) of a cell, and transitioning to multi-user MIMO (multiple-input multiple-output) adaptive beams per user (which operates to try to eliminate the cell edge) when more capacity is desired.

The system 100 can further include one or more communication service provider networks that facilitate providing wireless communication services to various UEs, including the UE 102 and others (not explicitly shown), via the network devices 104 and/or 105 and/or various additional network devices (not shown) included in the one or more communication service provider networks. The one or more communication service provider networks can include various types of disparate networks, including but not limited to: cellular networks, femto networks, picocell networks, microcell networks, internet protocol (IP) networks Wi-Fi service networks, broadband service network, enterprise networks, cloud based networks, and the like. For example, in at least one implementation, system 100 can be or include a large scale wireless communication network that spans various geographic areas. According to this implementation, the one or more communication service provider networks 106 can be or include the wireless communication network and/or various additional devices and components of the wireless communication network (e.g., additional network devices and cell, additional UEs, network server devices, etc.).

The network devices 104 and 105 can be connected to the one or more communication service provider networks (e.g., the core network 106) via one or more backhaul links. For example, the one or more backhaul links can comprise wired link components, such as a T1/E1 phone line, a digital subscriber line (DSL) (e.g., either synchronous or asynchronous), an asymmetric DSL (ADSL), an optical fiber backbone, a coaxial cable, and the like. The one or more backhaul links can also include wireless link components, such as but not limited to, line-of-sight (LOS) or non-LOS links which can include terrestrial air-interfaces or deep space links (e.g., satellite communication links for navigation).

The wireless communication system 100 can employ various cellular systems, technologies, and modulation schemes to facilitate wireless radio communications between devices (e.g., a UE 102 and the network device 104). While example embodiments might be described for 5G new radio (NR) systems, the embodiments can be applicable to any radio access technology (RAT) or multi-RAT system where the UE operates using multiple carriers e.g. LTE FDD/TDD, GSM/GERAN, CDMA2000 etc. For example, the system 100 can operate in accordance with global system for mobile communications (GSM), universal mobile telecommunications service (UMTS), long term evolution (LTE), LTE frequency division duplexing (LTE FDD, LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like. However, various features and functionalities of system 100 are particularly described wherein the devices (e.g., the UE 102 and the network devices 104 and 105) of system 100 are configured to communicate wireless signals using one or more multi carrier modulation schemes, wherein data symbols can be transmitted simultaneously over multiple frequency subcarriers (e.g., OFDM, CP-OFDM, DFT-spread OFDM, UFMC, FMBC, etc.). The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, the system 100 can be configured to provide and employ 5G wireless networking features and functionalities. With 5G networks that may use waveforms that split the bandwidth into several sub-bands, different types of services can be accommodated in different sub-bands with the most suitable waveform and numerology, leading to improved spectrum utilization for 5G networks. Notwithstanding, in the mmWave spectrum, the millimeter waves have shorter wavelengths relative to other communications waves, whereby mmWave signals can experience severe path loss, penetration loss, and fading. However, the shorter wavelength at mmWave frequencies also allows more antennas to be packed in the same physical dimension, which allows for large-scale spatial multiplexing and highly directional beamforming.

Performance can be improved if both the transmitter and the receiver are equipped with multiple antennas. Multi-antenna techniques can significantly increase the data rates and reliability of a wireless communication system. The use of multiple input multiple output (MIMO) techniques, which was introduced in the third-generation partnership project (3GPP) and has been in use (including with LTE), is a multi-antenna technique that can improve the spectral efficiency of transmissions, thereby significantly boosting the overall data carrying capacity of wireless systems. The use of multiple-input multiple-output (MIMO) techniques can improve mmWave communications; MIMO can be used for achieving diversity gain, spatial multiplexing gain and beamforming gain.

Note that using multi-antennas does not always mean that MIMO is being used. For example, a configuration can have two downlink antennas, and these two antennas can be used in various ways. In addition to using the antennas in a 2×2 MIMO scheme, the two antennas can also be used in a diversity configuration rather than MIMO configuration. Even with multiple antennas, a particular scheme might only use one of the antennas (e.g., LTE specification's transmission mode 1, which uses a single transmission antenna and a single receive antenna). Or, only one antenna can be used, with various different multiplexing, precoding methods etc.

The MIMO technique uses a commonly known notation (M×N) to represent MIMO configuration in terms number of transmit (M) and receive antennas (N) on one end of the transmission system. The common MIMO configurations used for various technologies are: (2×1), (1×2), (2×2), (4×2), (8×2) and (2×4), (4×4), (8×4). The configurations represented by (2×1) and (1×2) are special cases of MIMO known as transmit diversity (or spatial diversity) and receive diversity. In addition to transmit diversity (or spatial diversity) and receive diversity, other techniques such as spatial multiplexing (comprising both open-loop and closed-loop), beamforming, and codebook-based precoding can also be used to address issues such as efficiency, interference, and range.

Another concept is that of the rank of the transmission. In multiple antenna techniques, the incoming data can be split to be transmitted through multiple antennas, wherein each data stream processed and transmitted through an antenna is referred to as a transmission layer. The number of transmission layers is typically related to the number of transmit antennas. The data can be split into several parallel streams, where each stream contains different information. In another type, the incoming data is duplicated and each antenna transmits the same information. The term spatial layer refers to a data stream that includes information not included at the other layers. The rank of the transmission is equal to the number of spatial layers in an LTE spatial multiplexing transmission, that is, equals the number of different transmission layers transmitted in parallel. Even though the information in each layer may be manipulated in different ways by mathematical operations, when the operations do not change the information transmitted, a transmitter can be referred to as operating as a rank-1 transmitter. In a multi-antenna transmitter, different pieces of information are transmitted in parallel simultaneously in up to four different layers; a transmitter transmitting different information in parallel using four layers operates as a rank-4 transmitter.

Note that a DMRS structure for four antenna ports (hence maximum four layers and 4 DMRS) in NR system, for example, has reference symbols within a resource-block transmitted for a single antenna port 0; the same reference symbols are code multiplexed and transmitted on antenna port 1. Similarly for ports 2 and 3 same resource elements are used for transmitting DMRS (demodulation reference symbols), and are code multiplexed as in port 0 and 1. Further note that the resource elements used for rank 3 and rank 4 (ports 2 and 3) are orthogonal in frequency to that of port 0 and 1.

FIGS. 2-7 comprise a flow diagram representing an implementation of example operations directed towards jointly optimizing coverage, capacity and layer balance in a wireless communications network as described herein. As will be understood, the example operations factor in both uplink and downlink considerations, and operate to reduce interference.

Figure 2:
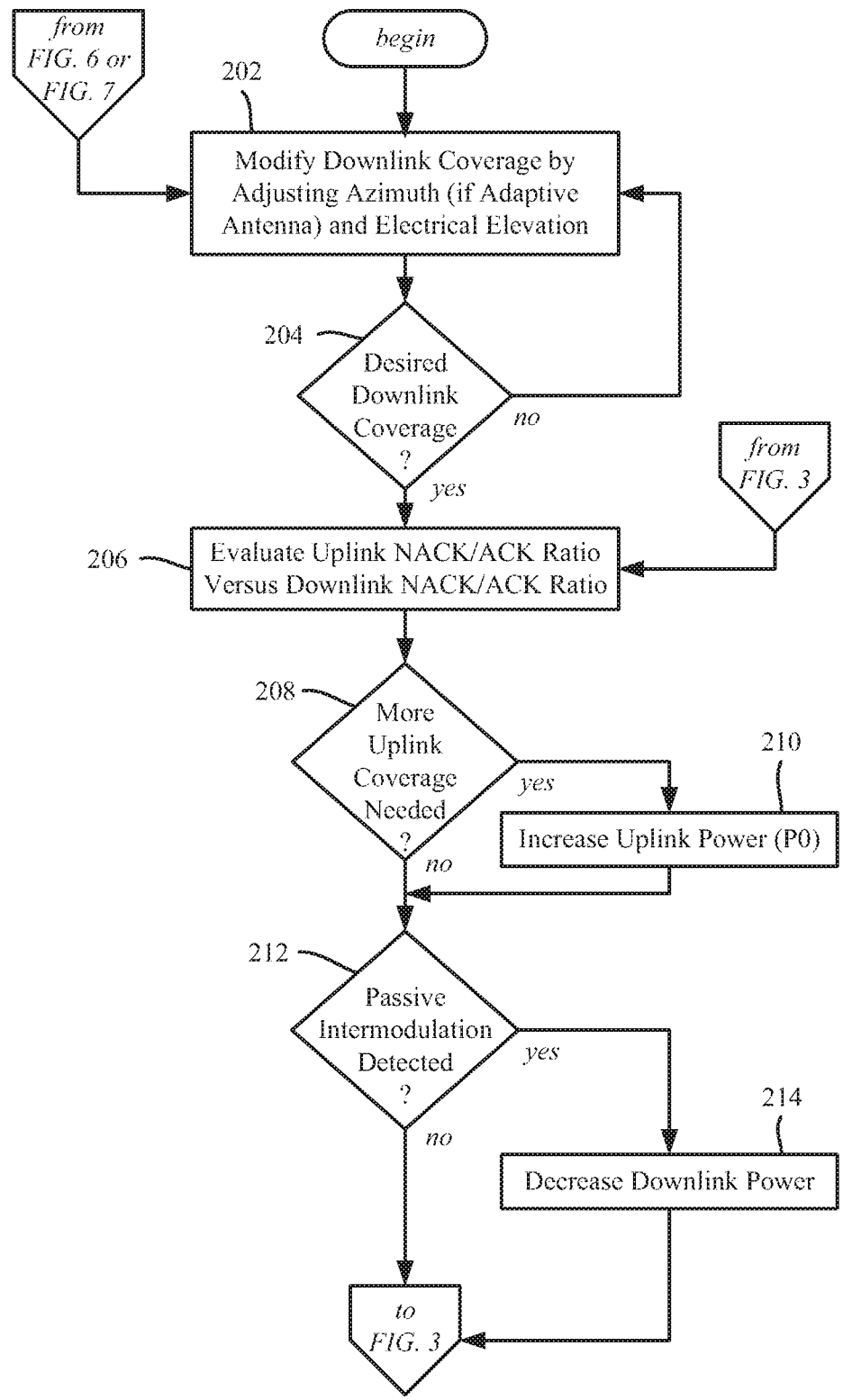
FIGS. 2-7 comprise a flow diagram of example operations for jointly optimizing coverage, capacity and layer balance in a wireless communications network, in accordance with various aspects and implementations of the subject disclosure.
Figure 3:
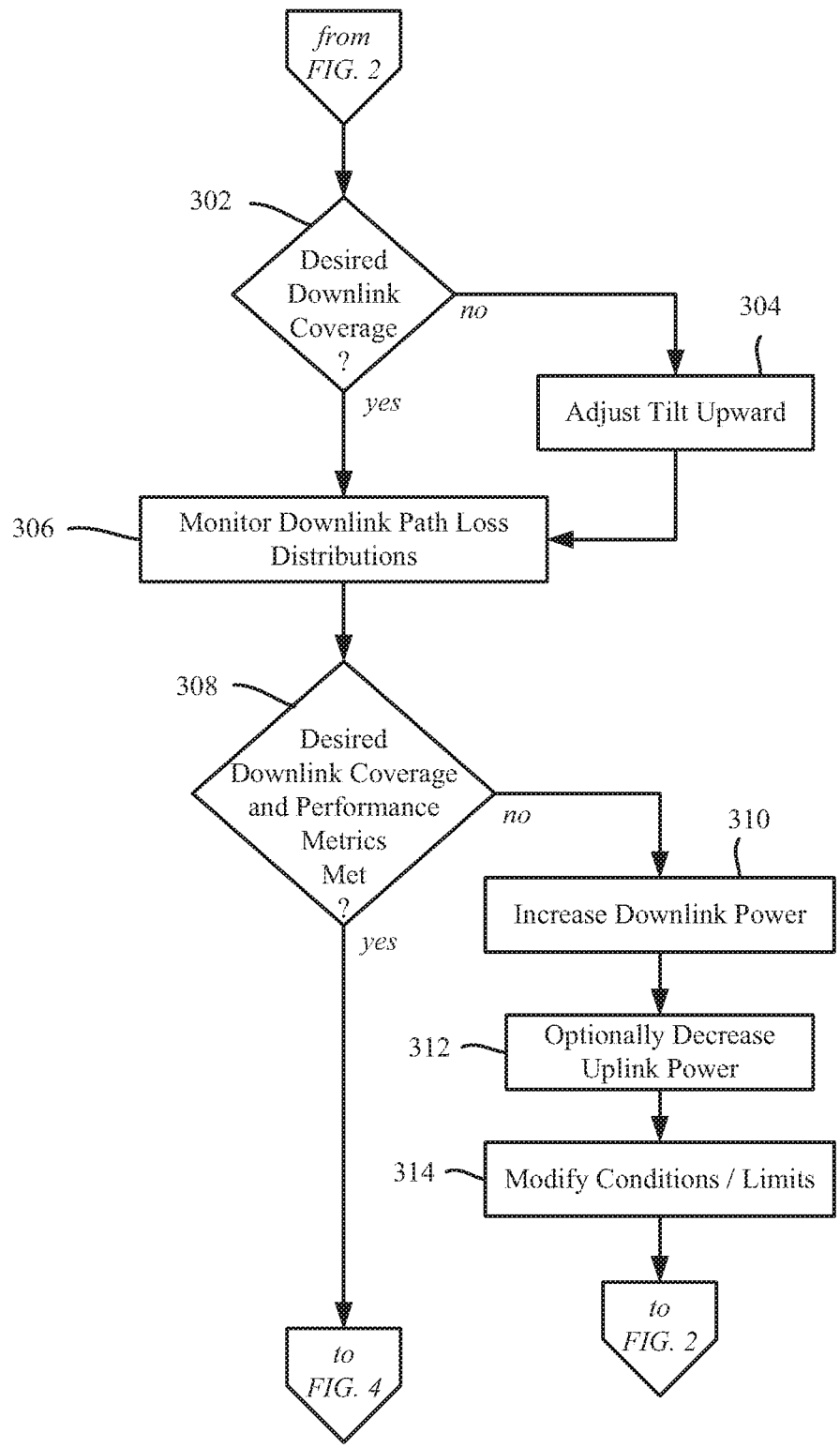

Operation 202 of FIG. 2 operates to obtain desired downlink coverage by adjusting antenna azimuth (for an adaptive antenna) and/or electrical elevation. Note that adjusting downlink power is more predictable than changing tilt with respect to modifying coverage, and thus downlink power is also adjustable. Operation 204 facilitates continuing the antenna adjustment (and possibly downlink power) until the desired downlink coverage is obtained.

Operation 206 evaluates uplink coverage for equality relative to the downlink coverage. One way to accomplish this is to consider the path loss data, e.g., uplink NACK/ACK ratio versus the downlink NACK/ACK ratio, which can indicate whether more downlink or uplink coverage is needed for coverage equality. If more uplink coverage is needed (operation 208), then operation 210 increases the PO uplink power (PO controls the target uplink receive power level at the base station).

Note that adjusting PO higher may cause interference. Because uplink noise increases with the downlink load or power if passive intermodulation is detected (operation 212), the downlink power may have to be decreased at operation 214 to balance the uplink and downlink.

Operation 302 of FIG. 3 again evaluates whether the downlink coverage remains at a desired level, because, for example, reducing the downlink power at operation 214 can reduce the downlink coverage. If so, operation 304 can be performed to adjust the tilt upward, thereby regaining lost coverage.

Operation 306 monitors downlink path loss distributions to insure desired coverage as well as performance (e.g., accessibility and retainability, etc.) metrics are met. If not, operation 310 can, for example, increase the downlink power (not necessarily the same amount as may have been decreased at operation 214), and operation 312 can (optionally) decrease the uplink power (not necessarily the same amount as may have been increased at operation 210.

Operation 314 represents modifying one or more conditions or limits before returning to operation 206 of FIG. 2 to reevaluate the changes, such as via operations 310 and/or 312. For example, consider that a desired uplink-downlink balance (as evaluated via the uplink NACK/ACK ratio versus the downlink NACK/ACK ratio) initially is at one level, but that level of balance cannot be attained given other desired coverage and performance metrics. The desired level of balance can be loosened via operation 314 so that another iteration (or possibly more than one) can hone in on a lower, but acceptable level of balance that meets desired coverage and performance metrics (which can also be modified per iteration). In this way, a good uplink and downlink balance without unacceptable passive intermodulation can be found by further adjusting the uplink and downlink power levels, while still meeting desired coverage and performance metrics.

Figure 4:
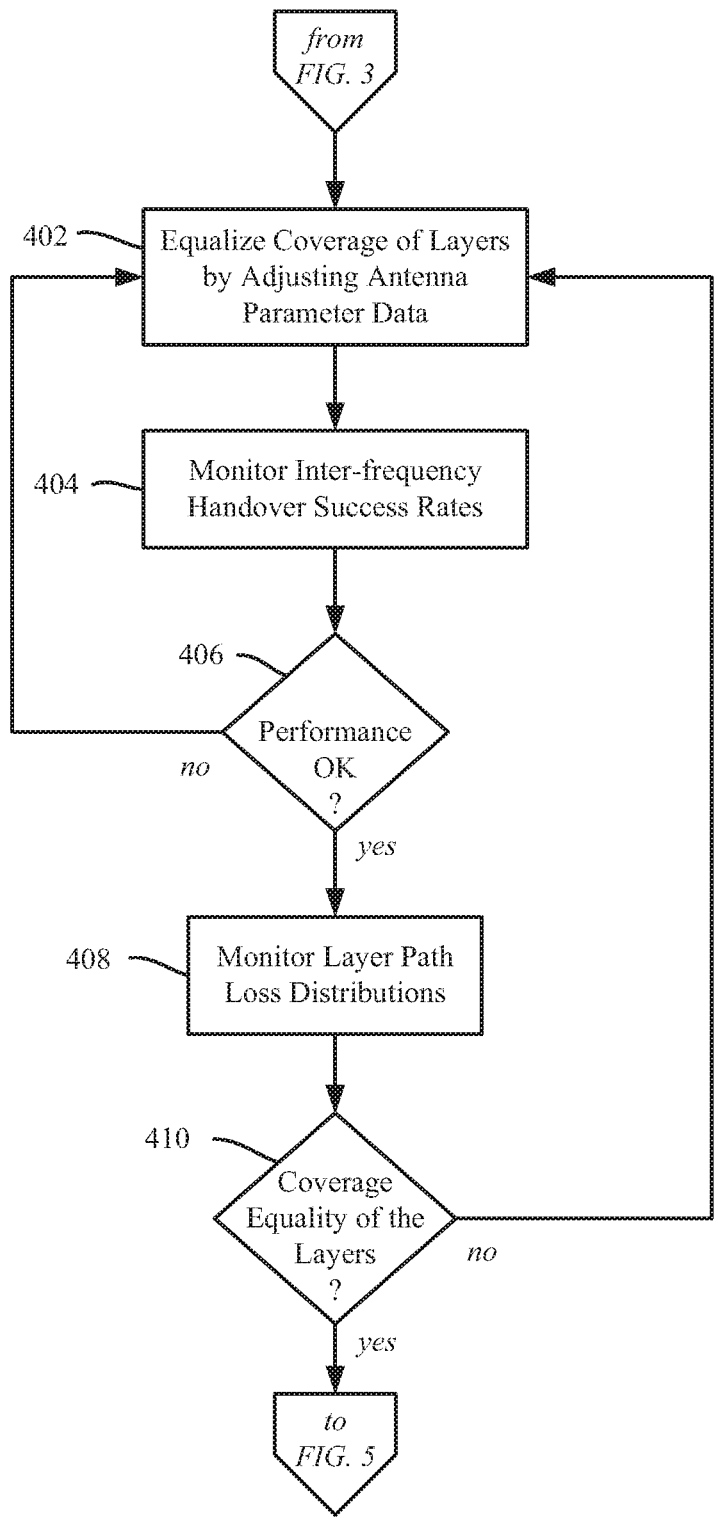

Often, within a cell there are many user devices on one layer (frequency band) or relatively few layers, and relatively few users on another layer or layers. Such a layer imbalance can result in a poor user experience on the crowded layer(s). Operation 402 of FIG. 4 represents attempting to equalize the coverage of each layer by adjusting one or more of the antenna parameters, via azimuth adjustment, (available for adaptive antennas), electrical elevation changes (for gradual adjustments, taking on the order of 30 seconds to a minute to complete), digital tilt (providing a near instantaneous elevation change) and beam shape (providing a near-instantaneous beam shape change). The antenna parameter changes results in sufficient coverage for handovers to different frequency bands (the layers) in the cell to improve the layer balance. It should be noted that not only the serving cell antennas can be adjusted, but neighbor cells (base stations), which influence the coverage via interference, can also be adjusted, such as to tilt down the neighbor base station antenna(s) to provide a cleaner signal on the serving cell's layer(s). Machine learning or the like can be applied to help learn/train antenna parameter and other data for any given cell and for clusters of cells.

Once the layer balance is maximized (that is, improved layer balance to a desired level), sector (face) capacity can be increased via resectorization as described herein to increase average (harmonic mean) throughput across the face.

Note that gradual electrical elevation changes are not useful for rapid adjustments, but can be useful to adjust capacity in many situations, such as when a stadium is filling up over time. It is also feasible to use statistics or the like to determine when to start electrical elevation changes, e.g., based on predicted increased load at certain times of the day.

Operation 404 represents monitoring the inter-frequency (inter-layer) handover success rates to determine whether performance is acceptable (operation 406). Operation 408 represents monitoring layer path loss distributions to check for coverage equality of the layers (operation 410). Note that operations 404 and 408 (along with the corresponding evaluations at operations 406 and 408, respectively), can be performed in parallel, at least to an extent. Possibly after some number of iterations, a desired level of coverage equalization is obtained with acceptable handover success rates and layer path loss distributions.

Figure 5:
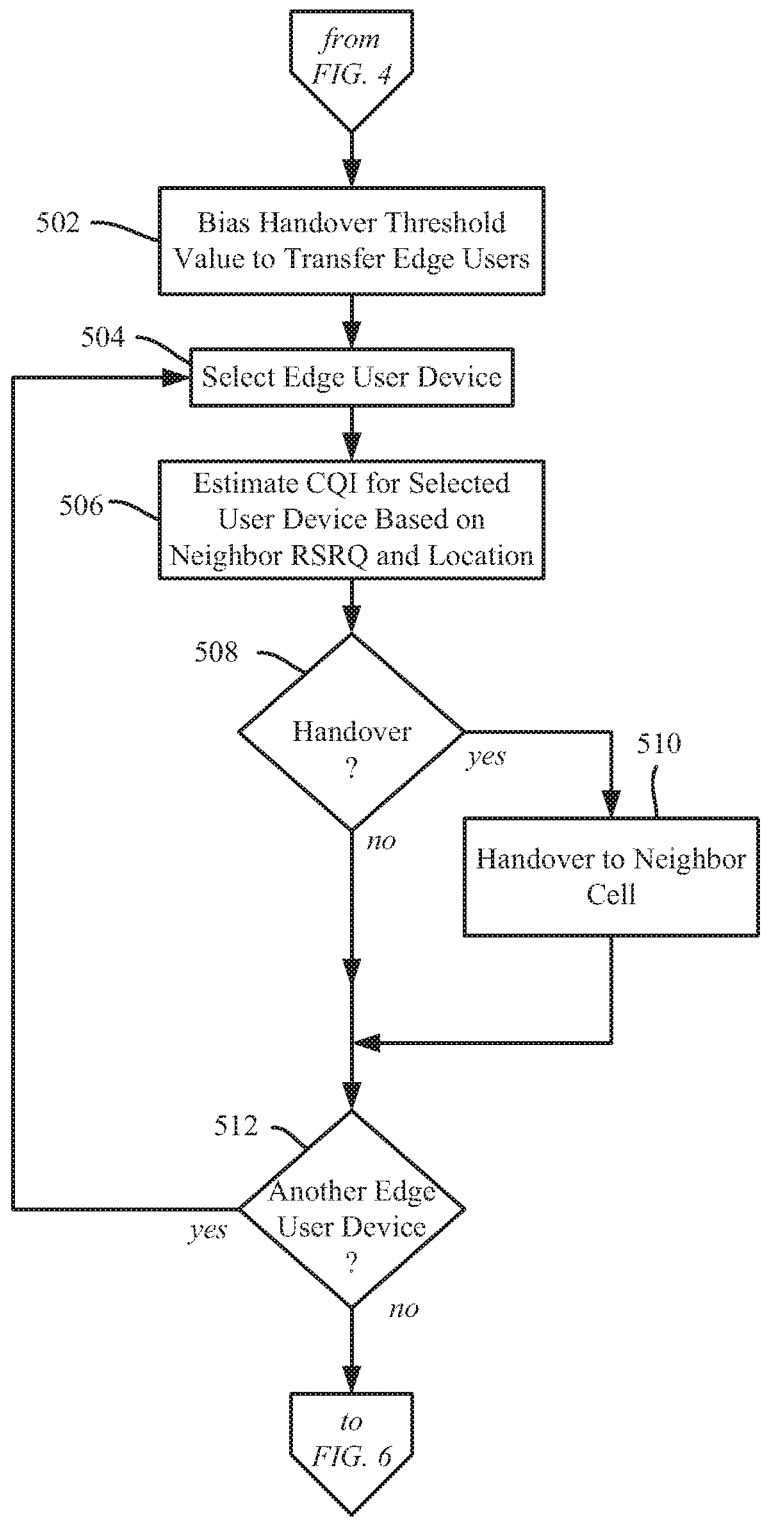
Figure 6:
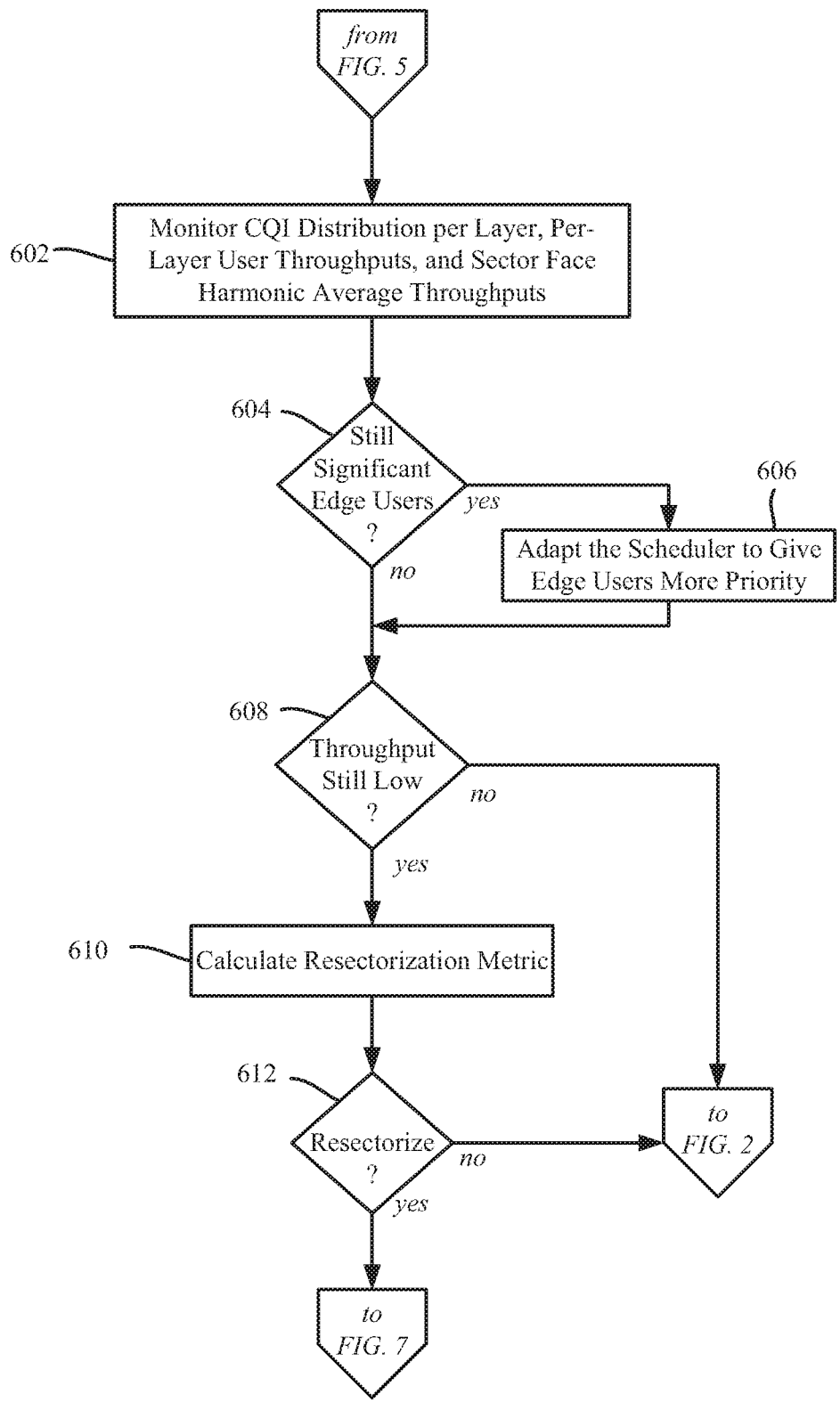

FIG. 5 is directed to steering edge traffic to one or more neighbor cells. By lowering (biasing) the handover threshold to a reduced level, e.g., 1 or 2 dB instead of 3 to 6 dB, and using an estimated channel quality indicator (CQI), handover can be biased to encourage handover to a neighbor cell and thus reduce the edge user devices in a given cell. Note that CQI is not directly available for a neighbor cell site, however, RSRQ is available. As described herein, mapping RSRQ at given localities to CQI—can help set the proper handover biases, which operates to increase layer balance and capacity in the source cell.

Operation 502 represents lowering the threshold value. Then, for a selected edge user device (operation 504), the CQI is estimated based on a neighbor cell's RSRQ and the geographic location of the edge device. More particularly, although CQI is not directly available, there is a strong correlation between RSRQ at a user device's location and CQI. When a neighbor cell is not particularly loaded, and significant interference in the serving cell is present, in many instances for an edge user device the neighbor cell's CQI is significantly better (e.g., 4 dB to 6 dB) than the CQI of the serving cell.

Thus, whether to handover given the reduced threshold is evaluated versus the estimated CQI at operation 508. If the biased handover threshold criterion is met, operation 510 performs the handover, which reduces the edge traffic.

Operation 512 repeats the process for a next selected edge user device, and so on. Note that FIG. 5 is only an explanatory example, and that handover evaluations and decisions for multiple devices can occur in parallel or substantially in parallel, at least to an extent.

Given the CQI-based handovers, operation 602 is performed to monitor performance-related information, including, for example, CQI distribution per layer, per-layer user throughputs, and sector face harmonic average throughputs. If significant edge users still remain, e.g., based on throughput data or other criteria, thus negatively impacting capacity, operation 606 operates to adapt the scheduler to give the edge users more priority relative to non-edge users, in an attempt to get such users off the cell edge, which improves harmonic throughput.

By way of a simplified example, consider that an edge user is buffering a streaming video at 0.5 Mbps, causing lots of pauses, while a non-edge user (e.g., near the cell center) is buffering a streaming video at near 20 Mbps. The priority can be adjusted so that the edge user increases to 2.0 Mbps, while the non-edge user is reduced to 18 Mbps. By adapting scheduler priority, the edge user receives a more satisfying user experience, while the non-edge user still receives sufficient download speed and typically does not notice any buffering delay.

If throughput is at an acceptable level as evaluated at operation 608, the joint optimization process returns to operation to repeat the joint optimization operations. Note that repeating joint optimization can be deferred until some need for change is detected, e.g., the load has increased (or decreased) sufficiently relative to a threshold load percentage or the like to trigger another joint optimization procedure. Alternatively, joint optimization can be repeated as often as practical, such as repeated in near real time, or based on a schedule, such as to re-optimize when increases and decreases in load are statistically predicted. This repeating of the operations thus can be done relatively often, possibly to make near-real time adjustments (and to check on the progress and adjust for the result of gradual adjustments such as electrical elevation changes).

Returning to operation 608, if instead after modification of the scheduler priority throughput is still low, operation 610 is performed, e.g., to calculate a resectorization metric. For example, instead of three 120 degree sectors in a 360 degree cell, six 60 degree sectors or twelve 30 degree sectors can be configured. However, this does not always lead to a gain; for example resectorization from three sectors to six sectors can result negative capacity gain. Accordingly, sectorization can be optimized by optimizing coverage by setting tilt, azimuth and/or power to adjust the cell edge/ minimize the cell edge boundary and/or minimize interference as much as possible.

In general, sector configuration based on the monitoring of the cell (harmonic mean of throughputs) biases the sector face(s) towards the one with the most traffic. For example, if a relatively large number of user devices are at one general location (e.g., at 120 degrees in a 360 degree cell), varying the sectors to put more sectors at that location increases throughput. Note that this is can be based on statistics, and resectorization can vary with time, such as to provide more capacity to an office building during office hours. Indeed, resectorization can provide a good solution for dense user distributions (such as for office complexes) where mobility is low.

Figure 7:
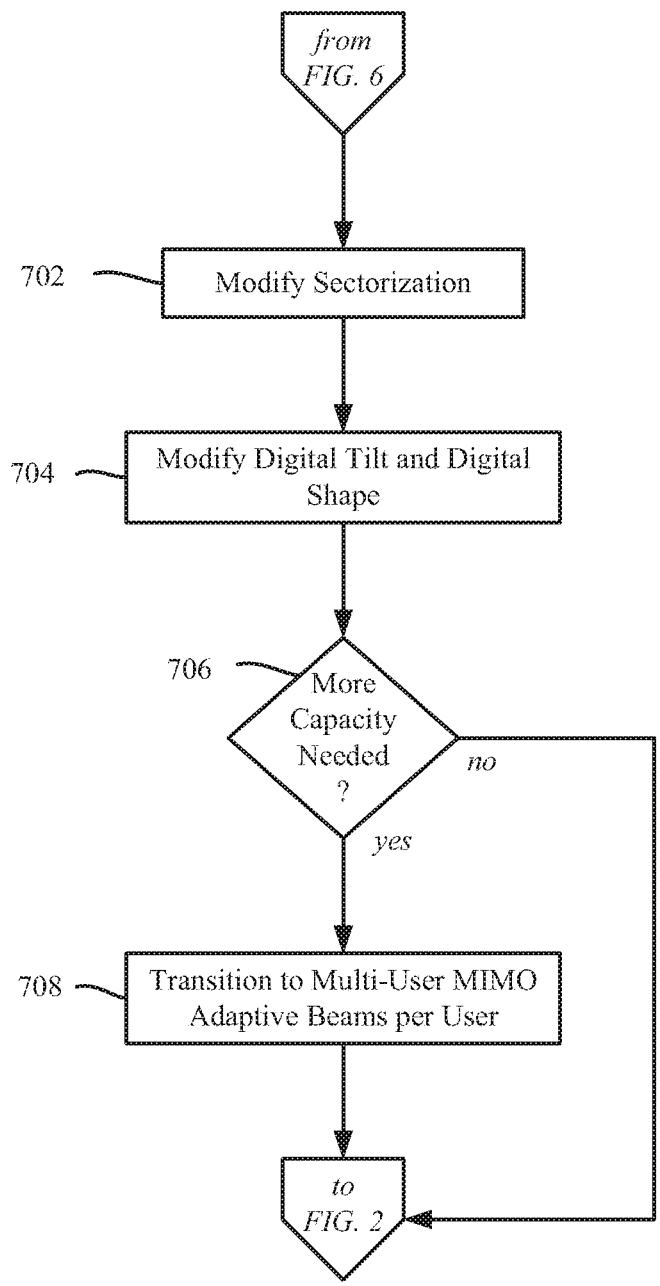

If resectorization is desirable as evaluated at operation 612, operation 702 of FIG. 7 modifies the resectorization, and operation 704 modifies the digital tilt and beam shape. set the sectors to optimize coverage and minimize cell edge as a function of User distributions (AZ, EL, power) to minimize interference Operation 706 evaluates whether more capacity is needed. If so, operation 708 transitions to multi-user MIMO adaptive beams per user, such as per layer. To this end, beams are directed to multiple users simultaneously, using spatial division multiplexing to differentiate user data via-different beams. This can significantly increase capacity. However, much of the bandwidth is frequency division duplexed (FDD), using different portions of bands for uplink versus downlink. From the uplink sounding reference signal (SRS), each user sends a copy to base station adaptive antennas to give the channel measurement. With on the order of 100 elements this can be complex for downlink, as training signal communication in FDD incurs far too much overhead. In one aspect, the uplink SRS data can be used to adapt the uplink beams accordingly, and then via machine learning or a suitable transformation algorithm, the uplink information can be transformed for the downlink beams.

Figure 8:
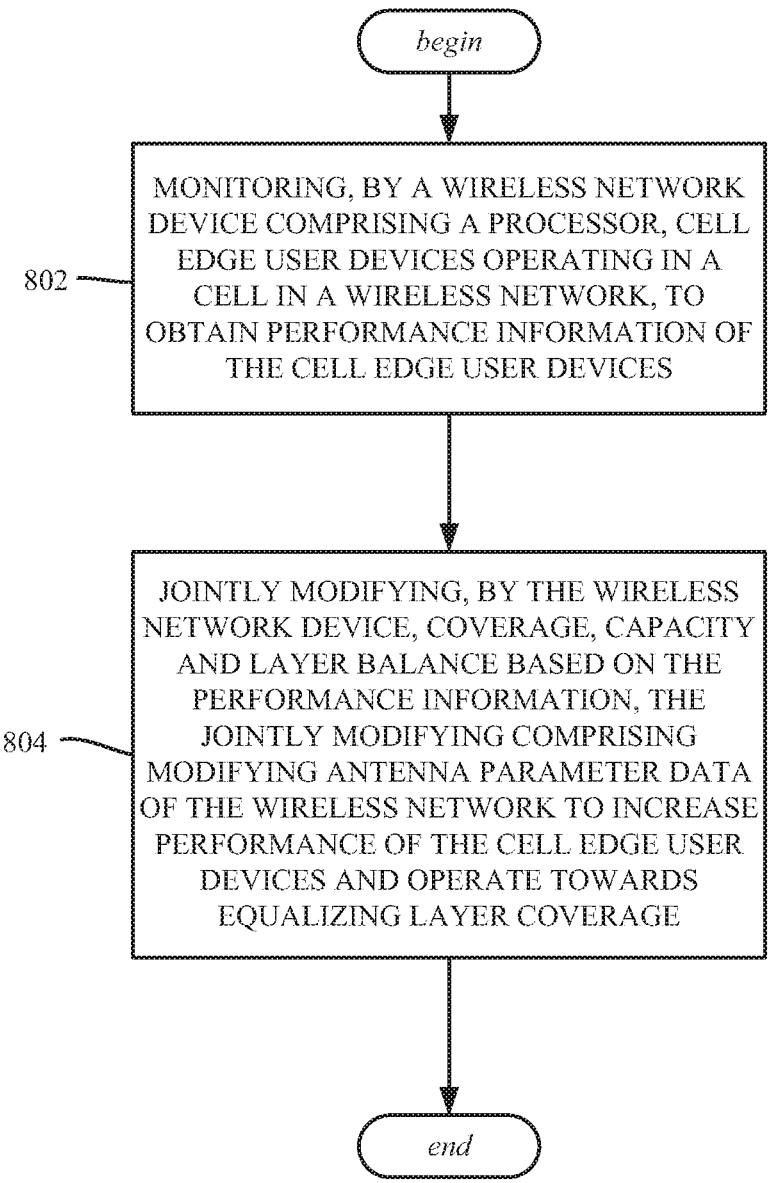
FIG. 8 illustrates a flow diagram of example operations of monitoring cell edge user devices to jointly modify antenna parameter data to increase performance of cell edge user devices, in accordance with various aspects and implementations of the subject disclosure.

FIG. 8 summarizes various example operations, such as of a method. Operation 802 represents monitoring, by a wireless network device comprising a processor, cell edge user devices operating in a cell in a wireless network, to obtain performance information of the cell edge user devices. Operation 804 represents jointly modifying, by the wireless network device, coverage, capacity and layer balance based on the performance information, the jointly modifying comprising modifying antenna parameter data of the wireless network to increase performance of the cell edge user devices and operate towards equalizing layer coverage.

Modifying the antenna parameter data can comprise modifying, for an antenna of the cell, at least one of: antenna elevation, antenna azimuth, digital tilt or shape of an antenna beam. The antenna of the cell can be a first antenna, and modifying the antenna parameter data further can comprise modifying, for a second antenna of a neighbor cell neighboring the cell, at least one of: antenna elevation, antenna azimuth, digital tilt or shape of an antenna beam.

Monitoring the cell edge user devices to obtain the performance information can comprise obtaining inter-frequency handover success rate data to change the antenna orientation, and obtaining layer path loss distribution data usable to adjust layer coverage.

Jointly modifying the coverage, the capacity and the layer balance can comprise jointly optimizing the coverage, the capacity and the layer balance based on the performance information, and wherein the jointly optimizing comprises mapping signal quality data to reference signal received quality data at any given location and changing the layer assignment of a cell edge user device of the cell edge user devices based on the reference signal received quality data.

Modifying the coverage, the capacity and the layer balance based on the performance information comprises obtaining reference signal received quality data and geographic location data for a user device, determining an estimated channel quality indicator based on the reference signal received quality data and the geographic location data, and biasing a handover threshold value based on the estimated channel quality indicator.

Jointly modifying the coverage, the capacity and the layer balance based on the performance information further can comprise changing scheduling priority of a cell edge user device of the cell edge user devices or scheduler class of a cell. The performance information can comprise throughput data, and jointly modifying the coverage, the capacity and the layer balance based on the performance information further can comprise resectorizing cell faces based on layer throughput data and/or load level.

The performance information further can comprise balance information corresponding to uplink acknowledgment-to-negative acknowledgment ratio data and downlink acknowledgment-to-negative acknowledgment ratio data, and jointly modifying the coverage, the capacity and the layer balance based on the performance information further can comprise controlling an uplink power target and a downlink power to balance uplink and downlink coverage, respectively.

The performance information further can comprise throughput data, and jointly modifying the coverage, the capacity and the layer balance based on the performance information further can comprise transitioning at least some of the cell edge user devices, based on the throughput data, to multi-user multiple input, multiple output adaptive beams to increase capacity.

Figure 9:
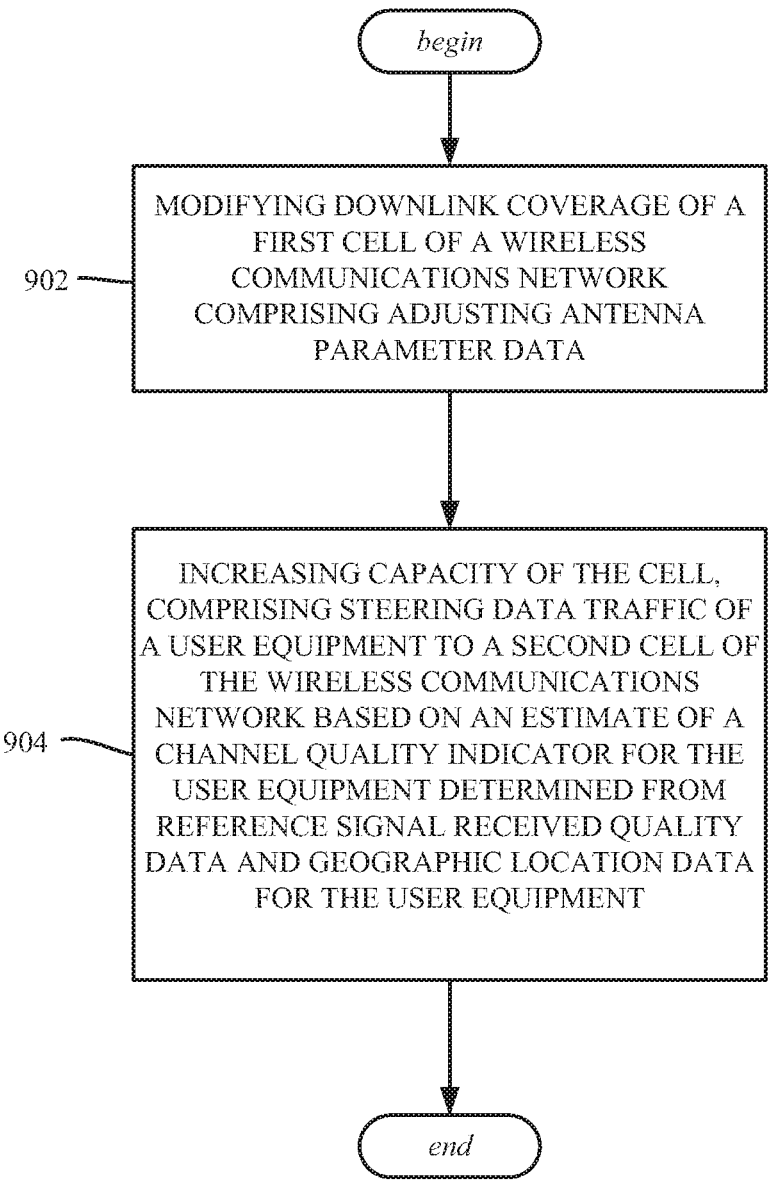
FIG. 9 illustrates a flow diagram of example operations for modifying antenna parameter data and increasing cell capacity by steering traffic to another cell, in accordance with various aspects and implementations of the subject disclosure.

FIG. 9 summarizes various example operations, such as of a wireless communications device of a wireless network, e.g., comprising a processor and a memory that stores executable instructions that, when executed by the processor, facilitate performance of operations. Operation 902 represents modifying downlink coverage of a first cell of a wireless communications network comprising adjusting antenna parameter data. Operation 904 represents increasing capacity of the cell, comprising steering data traffic of a user equipment to a second cell of the wireless communications network based on an estimate of a channel quality indicator for the user equipment determined from reference signal received quality data and geographic location data for the user equipment.

Adjusting the antenna parameter data can comprise adjusting at least one of: an antenna azimuth, an antenna elevation, a digital antenna tilt, or a digital beam shape, and wherein the operations further comprise increasing equalization of layer coverage comprising at least one of: further adjusting the antenna parameter data, adjusting a digital tilt or adjusting a digital beam shape.

Further operations can comprise determining coverage data representing a balance between uplink coverage and the downlink coverage, comprising evaluating uplink acknowledgment-to-negative acknowledgment ratio data relative to downlink acknowledgment-to-negative acknowledgment ratio data ratio, and increasing the balance between the uplink coverage and the downlink coverage by adjusting an uplink power to change the coverage data.

Further operations can comprise detecting passive intermodulation indicative of uplink noise, and in response to the detecting the passive intermodulation, decreasing a downlink power.

Further operations can comprise adapting scheduling priority of a cell edge user equipment and/or scheduler class of a cell.

Further operations can comprise performing a resectorization of cell faces of the cell based on throughput data.

Further operations can comprise transitioning cell edge user devices to multi-user multiple input, multiple output adaptive beams.

Figure 10:
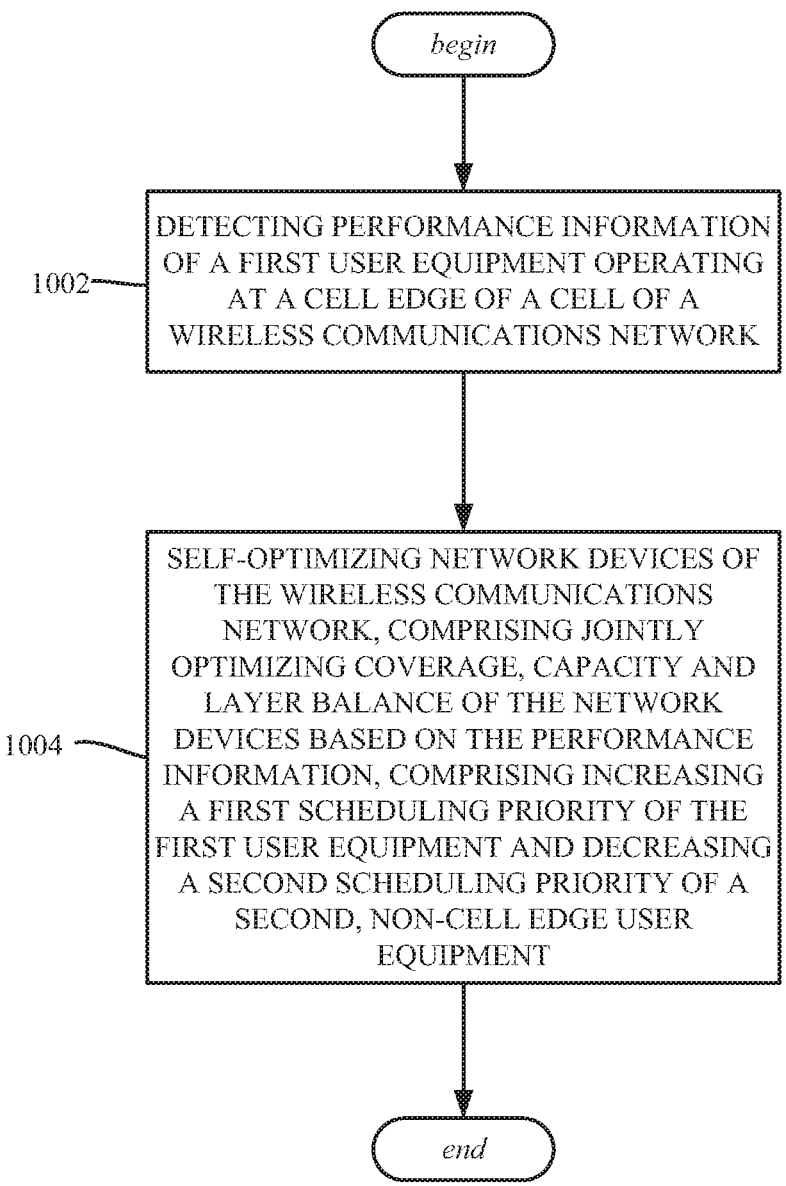
FIG. 10 illustrates a flow diagram of example operations to detect cell edge user device performance information and adjust scheduling priority based on the performance information to jointly optimize a wireless communications network, in accordance with various aspects and implementations of the subject disclosure.

Other example operations are represented in FIG. 10, and which, for example, can be implemented via a machine-readable storage medium, comprising executable instructions that, when executed by a processor of a first transmit and receive point device of a wireless network, facilitate performance of the operations. Operation 1002 represents detecting performance information of a first user equipment operating at a cell edge of a cell of a wireless communications network. Operation 1004 represents self-optimizing network devices of the wireless communications network, comprising jointly optimizing coverage, capacity and layer balance of the network devices based on the performance information, comprising increasing a first scheduling priority of the first user equipment and decreasing a second scheduling priority of a second, non-cell edge user equipment.

The cell of the wireless communications network can comprise a source cell, and jointly optimizing the coverage, capacity and layer balance based on the performance information further can comprise facilitating a handover of the first equipment from the source cell to a target cell based on an estimated channel quality indicator of the target cell.

Further operations can comprise attempting to equalize layer coverage of cell layers by adjusting at least one of: an antenna azimuth, an antenna elevation, a digital antenna tilt, or a digital beam shape.

As can be seen, the joint optimization technology described herein facilitates improved coverage, capacity and layer balance, while maintaining a constraint of a minimum cell edge user performance. Uplink and downlink coverages are considered in the joint optimization, and interference is detected, predicted (as necessary) and mitigated. The technology described herein eliminates (or at least significantly reduces) manual optimization processes, providing operational cost savings. Automated joint optimization can help with critical (e.g., first responder) networks needing very high reliability, including when there is a potential for high interference and loss of normal coverage in disaster areas.

Figure 11:
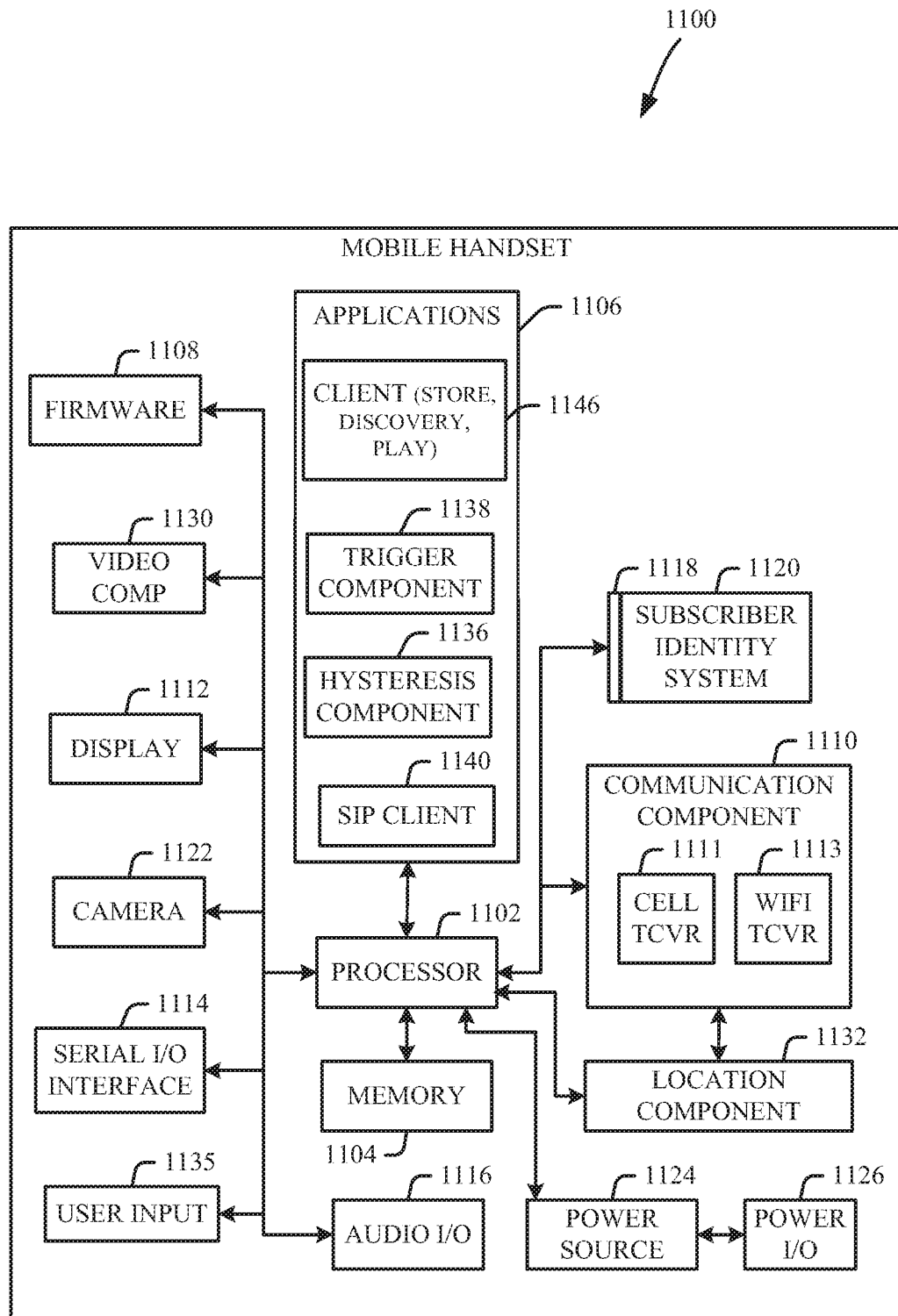
FIG. 11 illustrates an example block diagram of an example mobile handset operable to engage in a system architecture that facilitates wireless communications according to one or more embodiments described herein.

Referring now to FIG. 11, illustrated is a schematic block diagram of an example end-user device such as a user equipment) that can be a mobile device 1100 capable of connecting to a network in accordance with some embodiments described herein. Although a mobile handset 1100 is illustrated herein, it will be understood that other devices can be a mobile device, and that the mobile handset 1100 is merely illustrated to provide context for the embodiments of the various embodiments described herein. The following discussion is intended to provide a brief, general description of an example of a suitable environment 1100 in which the various embodiments can be implemented. While the description includes a general context of computer-executable instructions embodied on a machine-readable storage medium, those skilled in the art will recognize that the various embodiments also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset 1100 includes a processor 1102 for controlling and processing all onboard operations and functions. A memory 1104 interfaces to the processor 1102 for storage of data and one or more applications 1106 (e.g., a video player software, user feedback component software, etc.). Other applications can include voice recognition of predetermined voice commands that facilitate initiation of the user feedback signals. The applications 1106 can be stored in the memory 1104 and/or in a firmware 1108, and executed by the processor 1102 from either or both the memory 1104 or/and the firmware 1108. The firmware 1108 can also store startup code for execution in initializing the handset 1100. A communications component 1110 interfaces to the processor 1102 to facilitate wired/wireless communication with external systems, e.g., cellular networks, VoIP networks, and so on. Here, the communications component 1110 can also include a suitable cellular transceiver 1111 (e.g., a GSM transceiver) and/or an unlicensed transceiver 1113 (e.g., Wi-Fi, WiMax) for corresponding signal communications. The handset 1100 can be a device such as a cellular telephone, a PDA with mobile communications capabilities, and messaging-centric devices. The communications component 1110 also facilitates communications reception from terrestrial radio networks (e.g., broadcast), digital satellite radio networks, and Internet-based radio services networks.

The handset 1100 includes a display 1112 for displaying text, images, video, telephony functions (e.g., a Caller ID function), setup functions, and for user input. For example, the display 1112 can also be referred to as a "screen" that can accommodate the presentation of multimedia content (e.g., music metadata, messages, wallpaper, graphics, etc.). The display 1112 can also display videos and can facilitate the generation, editing and sharing of video quotes. A serial I/O interface 1114 is provided in communication with the processor 1102 to facilitate wired and/or wireless serial communications (e.g., USB, and/or IEEE 1394) through a hardwire connection, and other serial input devices (e.g., a keyboard, keypad, and mouse). This supports updating and troubleshooting the handset 1100, for example. Audio capabilities are provided with an audio I/O component 1116, which can include a speaker for the output of audio signals related to, for example, indication that the user pressed the proper key or key combination to initiate the user feedback signal. The audio I/O component 1116 also facilitates the input of audio signals through a microphone to record data and/or telephony voice data, and for inputting voice signals for telephone conversations.

The handset 1100 can include a slot interface 1118 for accommodating a SIC (Subscriber Identity Component) in the form factor of a card Subscriber Identity Module (SIM) or universal SIM 1120, and interfacing the SIM card 1120 with the processor 1102. However, it is to be appreciated that the SIM card 1120 can be manufactured into the handset 1100, and updated by downloading data and software.

The handset 1100 can process IP data traffic through the communication component 1110 to accommodate IP traffic from an IP network such as, for example, the Internet, a corporate intranet, a home network, a person area network, etc., through an ISP or broadband cable provider. Thus, VoIP traffic can be utilized by the handset 800 and IP-based multimedia content can be received in either an encoded or decoded format.

A video processing component 1122 (e.g., a camera) can be provided for decoding encoded multimedia content. The video processing component 1122 can aid in facilitating the generation, editing and sharing of video quotes. The handset 1100 also includes a power source 1124 in the form of batteries and/or an AC power subsystem, which power source 1124 can interface to an external power system or charging equipment (not shown) by a power I/O component 1126.

The handset 1100 can also include a video component 1130 for processing video content received and, for recording and transmitting video content. For example, the video component 1130 can facilitate the generation, editing and sharing of video quotes. A location tracking component 1132 facilitates geographically locating the handset 1100. As described hereinabove, this can occur when the user initiates the feedback signal automatically or manually. A user input component 1134 facilitates the user initiating the quality feedback signal. The user input component 1134 can also facilitate the generation, editing and sharing of video quotes. The user input component 1134 can include such conventional input device technologies such as a keypad, keyboard, mouse, stylus pen, and/or touch screen, for example.

Referring again to the applications 1106, a hysteresis component 1136 facilitates the analysis and processing of hysteresis data, which is utilized to determine when to associate with the access point. A software trigger component 1138 can be provided that facilitates triggering of the hysteresis component 1138 when the Wi-Fi transceiver 1113 detects the beacon of the access point. A SIP client 1140 enables the handset 1100 to support SIP protocols and register the subscriber with the SIP registrar server. The applications 1106 can also include a client 1142 that provides at least the capability of discovery, play and store of multimedia content, for example, music.

The handset 1100, as indicated above related to the communications component 810, includes an indoor network radio transceiver 1113 (e.g., Wi-Fi transceiver). This function supports the indoor radio link, such as IEEE 802.11, for the dual-mode GSM handset 1100. The handset 1100 can accommodate at least satellite radio services through a handset that can combine wireless voice and digital radio chipsets into a single handheld device.

Figure 12:
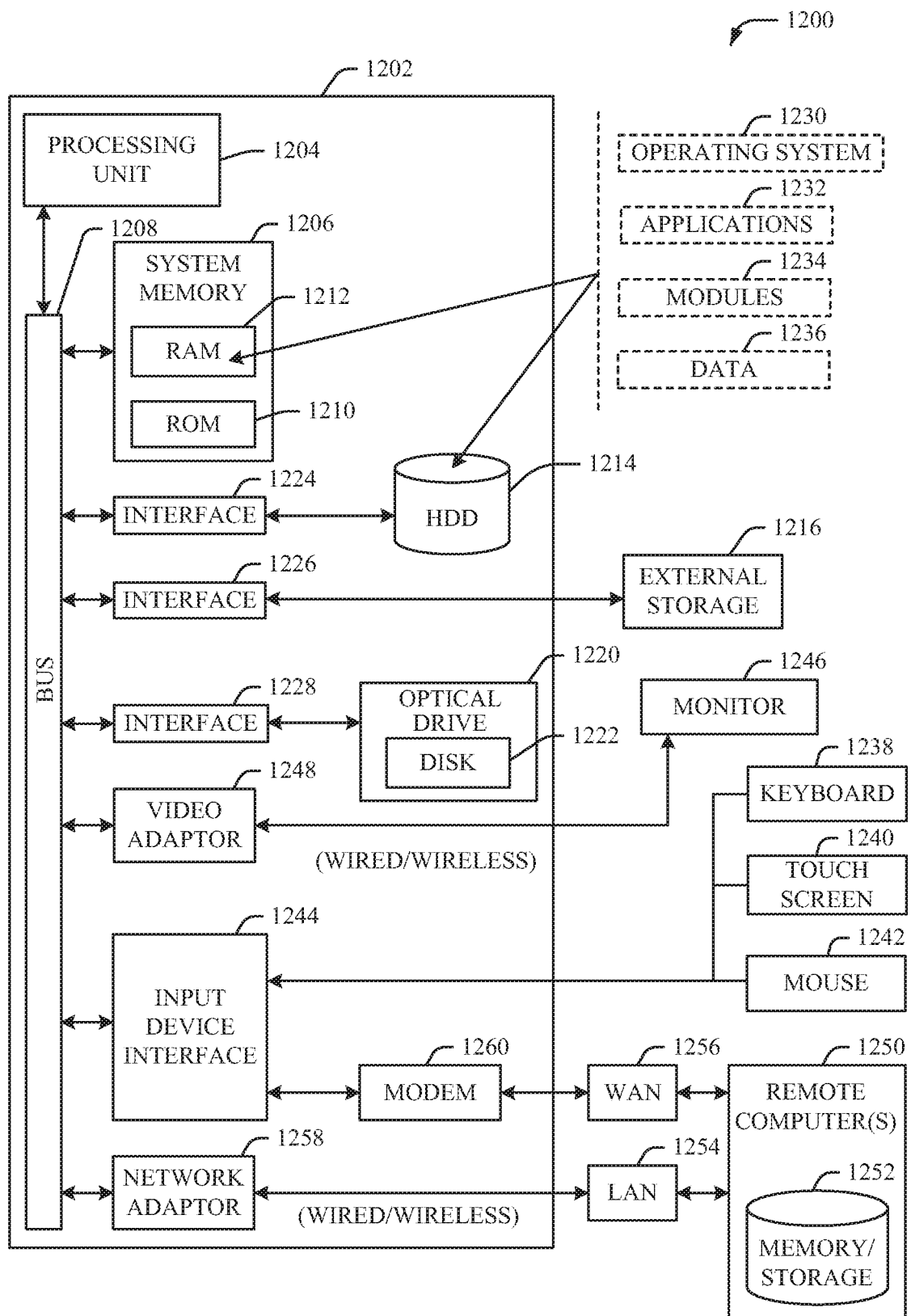
FIG. 12 illustrates an example block diagram of an example computer operable to engage in a system architecture that facilitates wireless communications according to one or more embodiments described herein.

In order to provide additional context for various embodiments described herein, FIG. 12 and the following discussion are intended to provide a brief, general description of a suitable computing environment 1200 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the technology described herein can be practiced with other computer system configurations, including single-processor or multiprocessor computer systems, minicomputers, mainframe computers, Internet of Things (IoT) devices, distributed computing systems, as well as personal computers, handheld computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 12, the example environment 1200 for implementing various embodiments of the aspects described herein includes a computer 1202, the computer 1202 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi-processor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 includes ROM 1210 and RAM 1212. A basic input/output system (BIOS) can be stored in a non-volatile memory such as ROM, erasable programmable read only memory (EPROM), EEPROM, which BIOS contains the basic routines that help to transfer information between elements within the computer 1202, such as during startup. The RAM 1212 can also include a high-speed RAM such as static RAM for caching data.

The computer 1202 further includes an internal hard disk drive (HDD) 1214 (e.g., EIDE, SATA), one or more external storage devices 1216 (e.g., a magnetic floppy disk drive (FDD) 1216, a memory stick or flash drive reader, a memory card reader, etc.) and an optical disk drive 1220 (e.g., which can read or write from a CD-ROM disc, a DVD, a BD, etc.). While the internal HDD 1214 is illustrated as located within the computer 1202, the internal HDD 1214 can also be configured for external use in a suitable chassis (not shown). Additionally, while not shown in environment 1200, a solid state drive (SSD) could be used in addition to, or in place of, an HDD 1214. The HDD 1214, external storage device(s) 1216 and optical disk drive 1220 can be connected to the system bus 1208 by an HDD interface 1224, an external storage interface 1226 and an optical drive interface 1228, respectively. The interface 1224 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1202, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. The systems and methods described herein can be implemented utilizing various commercially available operating systems or combinations of operating systems.

Computer 1202 can optionally comprise emulation technologies. For example, a hypervisor (not shown) or other intermediary can emulate a hardware environment for operating system 1230, and the emulated hardware can optionally be different from the hardware illustrated in FIG. 12. In such an embodiment, operating system 1230 can comprise one virtual machine (VM) of multiple VMs hosted at computer 1202. Furthermore, operating system 1230 can provide runtime environments, such as the Java runtime environment or the .NET framework, for applications 1232. Runtime environments are consistent execution environments that allow applications 1232 to run on any operating system that includes the runtime environment. Similarly, operating system 1230 can support containers, and applications 1232 can be in the form of containers, which are lightweight, standalone, executable packages of software that include, e.g., code, runtime, system tools, system libraries and settings for an application.

Further, computer 1202 can be enable with a security module, such as a trusted processing module (TPM). For instance with a TPM, boot components hash next in time boot components, and wait for a match of results to secured values, before loading a next boot component. This process can take place at any layer in the code execution stack of computer 1202, e.g., applied at the application execution level or at the operating system (OS) kernel level, thereby enabling security at any level of code execution.

A user can enter commands and information into the computer 1202 through one or more wired/wireless input devices, e.g., a keyboard 1238, a touch screen 1240, and a pointing device, such as a mouse 1242. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1204 through an input device interface 1244 that can be coupled to the system bus 1208, but can be connected by other interfaces, such as a parallel port, an IEEE 1394 serial port, a game port, a USB port, an IR interface, a BLUETOOTH® interface, etc.

A monitor 1246 or other type of display device can be also connected to the system bus 1208 via an interface, such as a video adapter 1248. In addition to the monitor 1246, a computer typically includes other peripheral output devices (not shown), such as speakers, printers, etc.

The computer 1202 can operate in a networked environment using logical connections via wired and/or wireless communications to one or more remote computers, such as a remote computer(s) 1250. The remote computer(s) 1250 can be a workstation, a server computer, a router, a personal computer, portable computer, microprocessor-based entertainment appliance, a peer device or other common network node, and typically includes many or all of the elements described relative to the computer 1202, although, for purposes of brevity, only a memory/storage device 1252 is illustrated. The logical connections depicted include wired/wireless connectivity to a local area network (LAN) 1254 and/or larger networks, e.g., a wide area network (WAN) 1256. Such LAN and WAN networking environments are commonplace in offices and companies, and facilitate enterprise-wide computer networks, such as intranets, all of which can connect to a global communications network, e.g., the Internet.

When used in a LAN networking environment, the computer 1202 can be connected to the local network 1254 through a wired and/or wireless communication network interface or adapter 1258. The adapter 1258 can facilitate wired or wireless communication to the LAN 1254, which can also include a wireless access point (AP) disposed thereon for communicating with the adapter 1258 in a wireless mode.

When used in a WAN networking environment, the computer 1202 can include a modem 1260 or can be connected to a communications server on the WAN 1256 via other means for establishing communications over the WAN 1256, such as by way of the Internet. The modem 1260, which can be internal or external and a wired or wireless device, can be connected to the system bus 1208 via the input device interface 1244. In a networked environment, program modules depicted relative to the computer 1202 or portions thereof, can be stored in the remote memory/storage device 1252. It will be appreciated that the network connections shown are example and other means of establishing a communications link between the computers can be used.

When used in either a LAN or WAN networking environment, the computer 1202 can access cloud storage systems or other network-based storage systems in addition to, or in place of, external storage devices 1216 as described above. Generally, a connection between the computer 1202 and a cloud storage system can be established over a LAN 1254 or WAN 1256 e.g., by the adapter 1258 or modem 1260, respectively. Upon connecting the computer 1202 to an associated cloud storage system, the external storage interface 1226 can, with the aid of the adapter 1258 and/or modem 1260, manage storage provided by the cloud storage system as it would other types of external storage. For instance, the external storage interface 1226 can be configured to provide access to cloud storage sources as if those sources were physically connected to the computer 1202.

The computer 1202 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE802.11 (a, b, g, n, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 2.4 and 8 GHz radio bands, at an 12 Mbps (802.11b) or 84 Mbps (802.11a) data rate, for example, or with products that contain both bands (dual band), so the networks can provide real-world performance similar to the basic "10BaseT" wired Ethernet networks used in many offices.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor also can be implemented as a combination of computing processing units.

In the subject specification, terms such as "store," "data store," "data storage," "database," "repository," "queue", and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory. In addition, memory components or memory elements can be removable or stationary. Moreover, memory can be internal or external to a device or component, or removable or stationary. Memory can comprise various types of media that are readable by a computer, such as hard-disc drives, zip drives, magnetic cassettes, flash memory cards or other types of memory cards, cartridges, or the like.

By way of illustration, and not limitation, nonvolatile memory can comprise read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated example aspects of the embodiments. In this regard, it will also be recognized that the embodiments comprise a system as well as a computer-readable medium having computer-executable instructions for performing the acts and/or events of the various methods.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data.

Computer-readable storage media can include, but are not limited to, random access memory (RAM), read only memory (ROM), electrically erasable programmable read only memory (EEPROM), flash memory or other memory technology, solid state drive (SSD) or other solid-state storage technology, compact disk read only memory (CD ROM), digital versatile disk (DVD), Blu-ray disc or other optical disk storage, magnetic cassettes, magnetic tape, magnetic disk storage or other magnetic storage devices or other tangible and/or non-transitory media which can be used to store desired information.

In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communications media comprise wired media, such as a wired network or direct-wired connection, and wireless media such as acoustic, RF, infrared and other wireless media Further, terms like "user equipment," "user device," "mobile device," "mobile," station," "access terminal," "terminal," "handset," and similar terminology, generally refer to a wireless device utilized by a subscriber or user of a wireless communication network or service to receive or convey data, control, voice, video, sound, gaming, or substantially any data-stream or signaling-stream. The foregoing terms are utilized interchangeably in the subject specification and related drawings. Likewise, the terms "access point," "node B," "base station," "evolved Node B," "cell," "cell site," and the like, can be utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows. It is noted that in the subject specification and drawings, context or explicit distinction provides differentiation with respect to access points or base stations that serve and receive data from a mobile device in an outdoor environment, and access points or base stations that operate in a confined, primarily indoor environment overlaid in an outdoor coverage area. Data and signaling streams can be packetized or frame-based flows.

Furthermore, the terms "user," "subscriber," "customer," "consumer," and the like are employed interchangeably throughout the subject specification, unless context warrants particular distinction(s) among the terms. It should be appreciated that such terms can refer to human entities, associated devices, or automated components supported through artificial intelligence (e.g., a capacity to make inference based on complex mathematical formalisms) which can provide simulated vision, sound recognition and so forth. In addition, the terms "wireless network" and "network" are used interchangeable in the subject application, when context wherein the term is utilized warrants distinction for clarity purposes such distinction is made explicit.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In addition, while a particular feature may have been disclosed with respect to only one of several implementations, such feature may be combined with one or more other features of the other implementations as may be desired and advantageous for any given or particular application. Furthermore, to the extent that the terms "includes" and "including" and variants thereof are used in either the detailed description or the claims, these terms are intended to be inclusive in a manner similar to the term "comprising."

The above descriptions of various embodiments of the subject disclosure and corresponding figures and what is described in the Abstract, are described herein for illustrative purposes, and are not intended to be exhaustive or to limit the disclosed embodiments to the precise forms disclosed. It is to be understood that one of ordinary skill in the art may recognize that other embodiments having modifications, permutations, combinations, and additions can be implemented for performing the same, similar, alternative, or substitute functions of the disclosed subject matter, and are therefore considered within the scope of this disclosure. Therefore, the disclosed subject matter should not be limited to any single embodiment described herein, but rather should be construed in breadth and scope in accordance with the claims below.

What is claimed is:

1. A method, comprising:
   monitoring, by a network device comprising a processor, cell edge user devices operating in a cell in a network, to obtain performance information of the cell edge user devices, wherein the performance information comprises balance information corresponding to uplink acknowledgment-to-negative acknowledgment ratio data and downlink acknowledgment-to-negative acknowledgment ratio data; and
   jointly modifying, by the network device, coverage, capacity and layer balance based on the performance information, the jointly modifying comprising modifying antenna parameter data of the network to increase performance of the cell edge user devices and make layer coverage more equal, and controlling an uplink power and a downlink power to balance uplink and downlink coverage.

2. The method of claim 1, wherein modifying the antenna parameter data comprises modifying, for an antenna of the cell, at least one of: antenna elevation, antenna azimuth, digital tilt, or shape of an antenna beam associated with the antenna.

3. The method of claim 2, wherein the antenna of the cell is a first antenna, wherein the antenna elevation is a first antenna elevation, wherein the antenna azimuth is a first antenna azimuth, wherein the digital tilt is a first digital tile, wherein the shape is a first shape, and wherein the antenna beam is a first antenna beam, and wherein modifying the antenna parameter data further comprises modifying, for a second antenna of a neighbor cell neighboring the cell, at least one of: a second antenna elevation, a second antenna azimuth, a second digital tilt or a second shape of a second antenna beam associated with the second antenna.

4. The method of claim 1, wherein monitoring the cell edge user devices to obtain the performance information comprises obtaining inter-frequency handover success rate data to change an antenna orientation, and obtaining layer path loss distribution data usable to adjust the layer coverage.

5. The method of claim 1, wherein jointly modifying the coverage, the capacity, and the layer balance further comprises jointly optimizing the coverage, the capacity, and the layer balance based on the performance information, and wherein the jointly optimizing comprises mapping signal quality data to reference signal received quality data at any given location and changing a layer assignment of a cell edge user device of the cell edge user devices based on the reference signal received quality data.

6. The method of claim 1, wherein jointly modifying the coverage, the capacity, and the layer balance based on the performance information further comprises obtaining reference signal received quality data and geographic location data for a user device, determining an estimated channel quality indicator based on the reference signal received quality data and the geographic location data, and biasing a handover threshold value based on the estimated channel quality indicator.

7. The method of claim 1, wherein jointly modifying the coverage, the capacity, and the layer balance based on the performance information further comprises changing scheduling priority of a cell edge user device of the cell edge user devices or scheduler class of the cell.

8. The method of claim 1, wherein the performance information further comprises layer throughput data, and wherein jointly modifying the coverage, the capacity and the layer balance based on the performance information further comprises resectorizing cell faces based on the layer throughput data and load level.

9. The method of claim 1, wherein the performance information further comprises throughput data, and wherein the jointly modifying the coverage, the capacity, and the layer balance based on the performance information further comprises transitioning at least some of the cell edge user devices, based on the throughput data, to multi-user multiple input, multiple output adaptive beams to increase the capacity.

10. A system, comprising:
    a processor; and
    a memory that stores executable instructions that, when executed by the processor, facilitate performance of operations, the operations comprising:
        modifying downlink coverage of a first cell of a communications network comprising adjusting antenna parameter data, comprising:
            determining coverage data representing a balance between uplink coverage and the downlink coverage based on evaluating uplink acknowledgment-to-negative acknowledgment ratio data relative to downlink acknowledgment-to-negative acknowledgment ratio data, and
            increasing the balance between the uplink coverage and the downlink coverage by adjusting an uplink power to change the coverage data; and
        increasing capacity of the first cell, comprising steering data traffic of a user equipment to a second cell of the communications network based on an estimate of a channel quality indicator for the user equipment determined from reference signal received quality data and geographic location data for the user equipment.

11. The system of claim 10, wherein adjusting the antenna parameter data comprises adjusting at least one of: an antenna azimuth, an antenna elevation, a digital antenna tilt, or a digital beam shape, and wherein the operations further comprise increasing equalization of layer coverage comprising at least one of: further adjusting the antenna parameter data, further adjusting the digital antenna tilt, or further adjusting the digital beam shape.

12. The system of claim 10, wherein the operations further comprise detecting passive intermodulation indicative of uplink noise, and in response to the detecting the passive intermodulation, decreasing a downlink power.

13. The system of claim 10, wherein the operations further comprise adapting scheduling priority of a cell edge user equipment or scheduler class of the first cell.

14. The system of claim 10, wherein the operations further comprise performing a resectorization of cell faces of the first cell based on throughput data.

15. The system of claim 10, wherein the operations further comprise transitioning cell edge user devices to multi-user multiple input, multiple output adaptive beams.

16. A non-transitory machine-readable medium, comprising executable instructions that, when executed by a processor facilitate performance of operations, the operations comprising:
    detecting performance information of a first user equipment operating at a cell edge of a cell of a wireless communications network, wherein the performance information comprises balance information corresponding to uplink acknowledgment-to-negative acknowledgment ratio data and downlink acknowledgment-to-negative acknowledgment ratio data; and
    facilitating self-optimizing of network devices of the wireless communications network, comprising jointly optimizing coverage, capacity and layer balance of the network devices based on the performance information, comprising increasing a first scheduling priority of the first user equipment and decreasing a second scheduling priority of a second, non-cell edge user equipment, and controlling an uplink power and a downlink power to balance uplink and downlink coverage.

17. The non-transitory machine-readable medium of claim 16, wherein the cell of the wireless communications network comprises a source cell, and wherein jointly optimizing the coverage, the capacity, and the layer balance based on the performance information further comprises facilitating a handover of the first user equipment from the source cell to a target cell based on an estimated channel quality indicator of the target cell.

18. The non-transitory machine-readable medium of claim 16, wherein the operations further comprise performing an equalization process on layer coverage of cell layers by adjusting at least one of: an antenna azimuth, an antenna elevation, a digital antenna tilt, or a digital beam shape.

19. The non-transitory machine-readable medium of claim 16, wherein jointly modifying the coverage, the capacity and the layer balance based on the performance information further comprises changing scheduling priority of the first user equipment.

20. The non-transitory machine-readable medium of claim 16, wherein the performance information further comprises layer throughput data, and wherein jointly modifying the coverage, the capacity, and the layer balance based on the performance information further comprises resectorizing cell faces based on the layer throughput data and load level.

* * * * *